June 24, 1930.  G. ROYAN  1,767,481

MIXING MACHINE

Filed Dec. 27, 1926

Inventor:
George Royan
By Fisher, Soule, Clapp & Soans Attys.

Patented June 24, 1930

1,767,481

UNITED STATES PATENT OFFICE

GEORGE ROYAN, OF CHICAGO, ILLINOIS, ASSIGNOR, BY MESNE ASSIGNMENTS, TO AMERICAN MACHINE & FOUNDRY COMPANY, OF NEW YORK, N. Y., A CORPORATION OF NEW JERSEY

MIXING MACHINE

Application filed December 27, 1926. Serial No. 157,095.

This invention relates to mixing machines, and more particularly to mixing machines of the type used for mixing and kneading dough, in which the mixing chamber is provided with a stationary cover beneath which the chamber is tilted to discharge its contents and to permit cleaning of the chamber. The objects of the invention are to provide means for preventing leakage of material from the chamber between the cover and the open top of the chamber; to provide means for preventing such leakage which will not materially hamper the tilting movement of the chamber, and in general, to provide an improved mixing machine structure of the class described.

Figure 1:
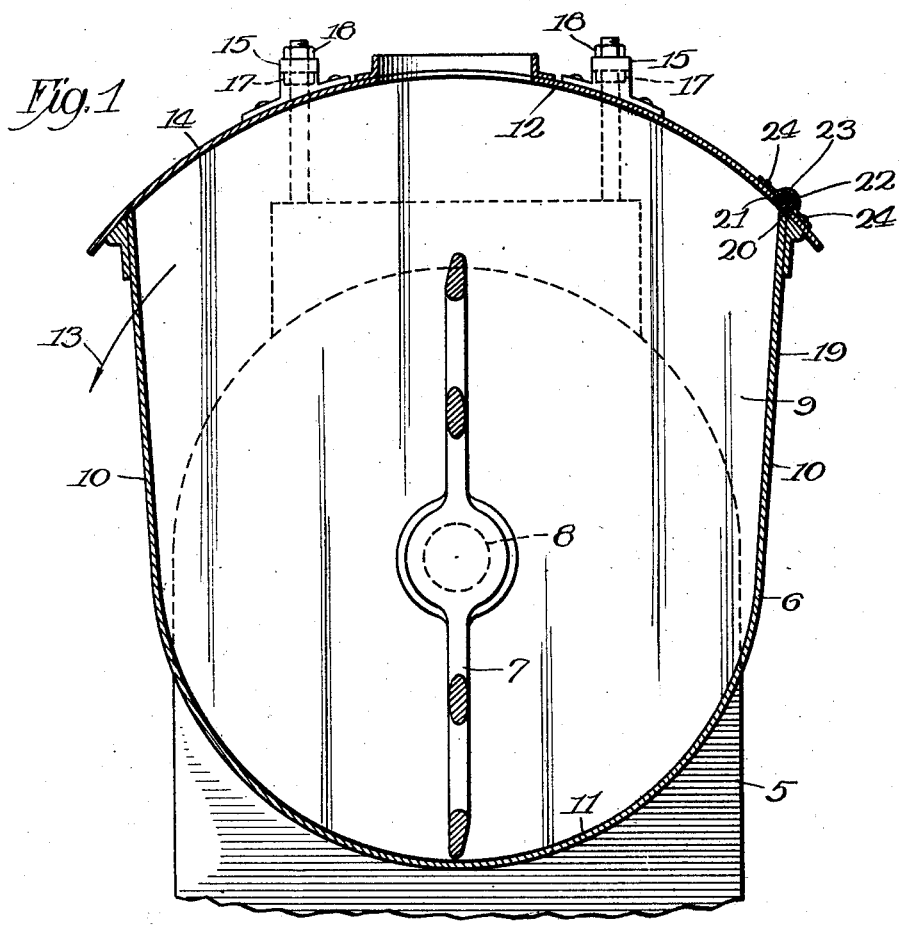
Figure 2:
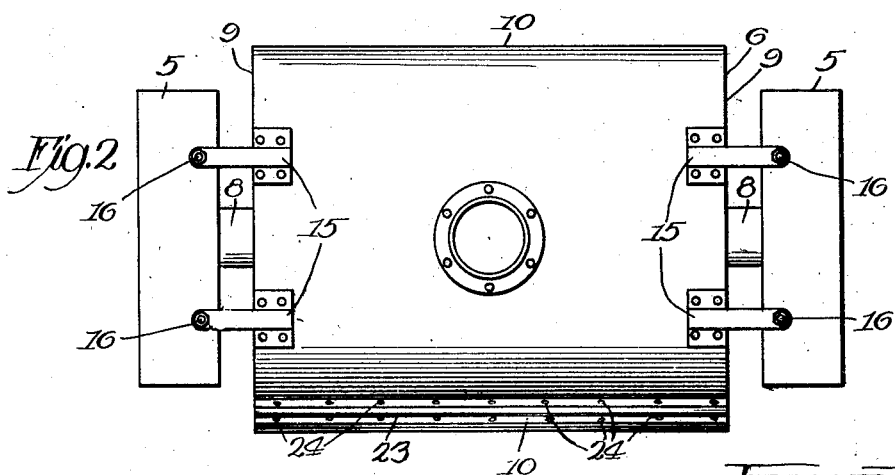

Other objects and advantage will be understood by reference to the following specification in connection with the accompanying drawing wherein I have illustrated a selected embodiment of my invention, and in which:

Fig. 1 is a cross section, and
Fig. 2 is a plan.

Referring now to the drawings, I have indicated a pair of standards 5—5 which support a mixing chamber 6 therebetween. An agitator 7 is provided within the mixing chamber 6 and is rotatable therein by means of stub shafts 8 at its opposite ends which extend through the end walls 9—9 of the chamber, and are suitably journaled and driven by mechanism preferably provided within the standards 5.

The chamber 6 compresses a substantially U-shaped receptacle having side walls 10—10 and a rounded bottom 11 which is preferably concentric with the axis of the rotatable agitator 7. The hopper is provided with end walls 9, above mentioned, which are curved at their upper edges as indicated at 12 about the axis of the rotatable member, and the chamber is mounted so as to be tiltable about the said axis in the direction indicated by the arrow 13.

For retaining material within the chamber when the agitator is in operation, I provide a cover 14 which is curved to closely fit the curvature of the upper edges of the end walls and this cover is fixedly mounted by suitable means such as brackets 15–15 which are secured thereto by means such as riveting and which extend endwise from the cover and engage supporting members 16 which are rigidly mounted in the standards 5.

The supporting members 16 are screwthreaded and are provided with nuts 17 which the cover brackets engage, and whereby the cover is supported, and nuts 18 are provided over the respective brackets 15 to lock the cover in position. It will be apparent that the cover may be adjusted upwardly or downwardly so as to closely fit the edges of the end walls of the chamber.

I have found in practice that the action of the agitator on the material which is being mixed in the chamber, tends to throw some of the material and particularly the lighter liquid portion thereof, upwardly against the cover and towards the back side wall which is indicated at 19. Continued throwing up of the material in this manner usually results in a considerable leakage of the material between the inside of the cover 12 and the upper edge 20 of the said back wall 19 of the chamber. In order to prevent such leakage I provide a recess or slot 21 in the cover above the edge 20 of the chamber. In the slot 21 I insert from the outside of the cover, a gasket preferably in the form of a strip of compressible material such as a round rubber strip 22, which is of somewhat larger diameter than the width of the slot 21 and which therefore, cannot pass through the slot. The dimensions of the slot and strip are such that the strip extends through the slot and projects beyond the inside of the cover a small amount, which is sufficient to require compression of the strip by the edge 20 of the chamber, when the chamber is in closed position as illustrated. Suitable retaining means as 23 are provided over the strip and secured to the cover by means such as screws 24 for retaining the strip in its above described position. The strip is of course forced into the slot with sufficient pressure to effectively close the slot so that there can be no leakage therethrough.

When material in the chamber has been thoroughly mixed, and is to be removed from the chamber, the latter is tilted about the axis of the rotatable member 7 as above described, and it will be observed that the edge 20 of the back wall 19 of the chamber will be effective to scrape material adhering to the cover therefrom as the chamber is tilted, and that the compressible strip 22 will not materially hinder the tilting operation, since its compressible quality readily enables it to yield sufficiently to permit the edge 20 to pass thereunder. It will be further understood from an inspection of the drawings, and particularly Fig. 1 that the above described means for effecting a tight or leak-proof joint between the top edge of the chamber and the cover is such that there are no elements on the inside of the cover which would materially hinder the tilting operation or which would increase the burden of cleaning the inside of the mixing machine.

I am aware that changes may be made in the form and construction of my above described invention and I therefore, do not wish to be limited to the exact form shown, but desire that the scope of my invention be determined by reference to the following claims which I desire to have construed as broadly as possible, consistent with the state of the art.

I claim as my invention:

1. In a mixing machine, the combination of a receptacle having an open top, a cover for closing said open top, said receptacle and cover being mounted so as to be movable relative to each other and said cover being slotted over a top edge portion of the receptacle, a strip of compressible material having a greater cross sectional dimension than the width of said slot, disposed therein on the outside of the cover, the greater cross sectional dimension of the strip being effective to position the strip in the slot so that the strip projects through the slot beyond the inner side of the cover a distance sufficient to require compression thereof when the cover and receptacle are in closed position, and means for retaining said strip in said slot.

2. In a machine of the class described, the combination of an open topped receptacle mounted so as to be tiltable into open and closed position about a substantially horizontal axis, said receptacle including side and end walls, the latter having their upper edges curved about said axis, a fixedly mounted cover disposed over the top edges of said side and end walls, having a slot therein disposed over the top edge of one of said side walls and said cover being curved about said axis so as to fit over said curved edges of said end walls, thereby to permit said tilting movement of the receptacle, and means for effecting a tight joint between said cover and said side wall top edge, said means comprising a gasket strip inserted into said slot from the outside of the cover and having a cross sectional dimension greater than the width of said slot whereby the strip is prevented from passing through said slot, means for forcing said strip through said slot sufficiently to cause the strip to project beyond the inside face of the cover a distance sufficient to cause the gasket to tightly engage said side wall edge portion.

3. In a mixing machine of the class described, the combination of a receptacle having an open top, a cover for closing said open top, said cover lapping over the edges of the receptacle around said open top, and said receptacle and cover being mounted so as to be laterally movable relative to each other into open and closed positions, means for effecting a tight joint between the inside of said cover and an edge portion of said receptacle, said means comprising a strip of compressable material mounted on said cover and projecting inwardly therefrom sufficiently to be engaged and compressed by said edge portion when said parts are in closed position.

4. In a mixing machine of the class described, the combination of a receptacle having an open top, a cover for closing said open top, said cover lapping over the edges of the receptacle around said open top, and said receptacle and cover being mounted so as to be laterally movable relative to each other into open and closed position, means for effecting a tight joint between the inside of said cover and an edge portion of said receptacle, said means comprising a strip of compressable material recessed into the inner side of said cover by projecting inwardly therefrom sufficiently to be engaged and compressed by said edge portion when the parts are in closed position.

5. In a mixing machine, the combination of an open topped receptacle constituting a mixing chamber, said receptacle being mounted so as to be tiltable about a substantially horizontal axis and having end walls, the upper edges of which are arcuate and concentric with said axis, a fixedly mounted cover provided with a recess located over a portion of the edge of the receptacle around said open top and curved to fit over said arcuate edges to thereby permit said tilting movement of the receptacle, means for effecting a tight joint between said cover and said edge portion so as to prevent leakage therebetween, said means comprising a strip of compressable material seated in said recess and projecting inwardly therefrom so as to be engaged and compressed by said receptacle edge when the receptacle is in closed position.

6. In a mixing machine, the combination of an open topped receptacle constituting a mixing chamber, said receptacle being mounted so as to be tiltable about a substantially horizontal axis and having end walls, the upper edges of which are arcuate and concentric with said axis, a fixedly mounted cover provided with a slot located over a portion of the edge of the receptacle around said open top and curved to fit over said arcuate edges to thereby permit said tilting movement of the receptacle, means for effecting a tight joint between said cover and said edge portion so as to prevent leakage therebetween, a round strip of rubber of greater diameter than the width of said slot, said strip being disposed in said slot on the outside of the cover and positioned therein by said greater diameter so that a portion of the strip extends through the slot a distance sufficient to be engaged and compressed by said receptacle edge when the receptacle is in closed position, and means on the outside of said cover for holding the strip in said slot.

GEORGE ROYAN.